(12) United States Patent
Oliver et al.

(10) Patent No.: US 10,597,312 B2
(45) Date of Patent: Mar. 24, 2020

(54) METHODS OF REMOVING PERCHLORATE FROM WATER AND VESSELS AND SYSTEMS FOR PRACTICING THE SAME

(71) Applicant: THE REGENTS OF THE UNIVERSITY OF CALIFORNIA, Oakland, CA (US)

(72) Inventors: Scott Oliver, Aptos, CA (US); Ian Colinas, Santa Cruz, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 15/557,680

(22) PCT Filed: Mar. 15, 2016

(86) PCT No.: PCT/US2016/022466
§ 371 (c)(1),
(2) Date: Sep. 12, 2017

(87) PCT Pub. No.: WO2016/149267
PCT Pub. Date: Sep. 22, 2016

(65) Prior Publication Data
US 2018/0050932 A1 Feb. 22, 2018

Related U.S. Application Data

(60) Provisional application No. 62/134,424, filed on Mar. 17, 2015.

(51) Int. Cl.
*C02F 1/42* (2006.01)
*B01J 41/09* (2017.01)
(Continued)

(52) U.S. Cl.
CPC ............... *C02F 1/42* (2013.01); *B01J 20/226* (2013.01); *B01J 41/09* (2017.01); *B01J 49/57* (2017.01);
(Continued)

(58) Field of Classification Search
None
See application file for complete search history.

(56) References Cited

U.S. PATENT DOCUMENTS 5,302,285 A    4/1994 Attaway et al.
6,214,607 B1   4/2001 Logan
(Continued)

FOREIGN PATENT DOCUMENTS

WO    WO 2002/016928    2/2002

OTHER PUBLICATIONS

Fei, et al., Synthesis,Characterization, and Catalytic Application of a Cationic Metal—Organic Framework: Ag2(4,4'bipy)2(O3SCH2CH2O3), Chem. Mater., 2010, 22:2027-2032 (Year: 2010).*

(Continued)

*Primary Examiner* — Chester T Barry
(74) *Attorney, Agent, or Firm* — Brian E. Davy; Bozicevic, Field & Francis LLP

(57) ABSTRACT

Provided are methods of removing perchlorate from water. The methods include contacting water suspected of containing perchlorate with a cationic material. The cationic material includes one or more cationic metal atoms connected by an atom or molecule into an extended structure, and a charge balancing anion. The contacting removes perchlorate (e.g., selectively), if present, from the water. Water treatment vessels, systems and facilities that find use in practicing the methods of the present disclosure are also provided.

14 Claims, 12 Drawing Sheets

(51) Int. Cl.
  *B01J 49/57*   (2017.01)
  *B01J 20/22*   (2006.01)
  *C02F 101/12*  (2006.01)

(52) U.S. Cl.
  CPC .... *C02F 2001/425* (2013.01); *C02F 2101/12* (2013.01); *C02F 2303/16* (2013.01)

(56) References Cited

U.S. PATENT DOCUMENTS

| | | | | |
|---|---|---|---|---|
| 6,666,973 | B1* | 12/2003 | Kikuyama | C02F 1/02 |
| | | | | 159/47.3 |
| 7,285,362 | B2* | 10/2007 | Harrup | H01M 6/168 |
| | | | | 429/303 |
| 7,309,436 | B2 | 12/2007 | Jensen et al. | |
| 7,754,071 | B2 | 7/2010 | Jensen et al. | |
| 7,850,854 | B2 | 12/2010 | Gurol et al. | |
| 8,123,834 | B2* | 2/2012 | Masel | B01D 15/00 |
| | | | | 73/23.41 |
| 8,323,496 | B2 | 12/2012 | Canzano et al. | |
| 2005/0167366 | A1 | 8/2005 | Cannon et al. | |
| 2012/0261336 | A1 | 10/2012 | Brunner | |
| 2012/0312746 | A1 | 12/2012 | Banerjee et al. | |
| 2014/0102980 | A1 | 4/2014 | Moe et al. | |
| 2015/0136036 | A1* | 5/2015 | Wang | A01K 1/0155 |
| | | | | 119/171 |
| 2016/0231267 | A1* | 8/2016 | Swager | G01N 27/127 |
| 2016/0268633 | A1* | 9/2016 | Schofield | H01M 4/622 |

OTHER PUBLICATIONS

Wang, L.-S., Zhang, J.-F., Yang, S.-P., catena—Poly[[silver(I)-u-4,4'-bipyridine-K2 N:N'] perchlorate ], Acta Crystallogr., Sect. E: Struct. Rep. Online 2004, 60(10), m1484-m1486. (Year: 2004).*

Colinas et al., "Reversible, Selective Trapping of Perchlorate from Water in Record Capacity by Cationic Metal-Organic Framework" Environ. Sci. Technology (Jan. 14, 2016) 50:1949-1954.

Fei et al., "Synthesis of Cationic Extended Frameworks for Anion-Based Applications" Dissertation, University of California Santa Cruz (Sep. 2012) (retrieved May 2, 2016) pp. xvii-xxii, 1-33, 36-38, 53-62, 76-79, 113-117.

Wang et al., "*catena*—Poly[[silver(1)-μ-4-4'-bipyridine-κ²N:N']perchlorate]" metal-organic papers, Acta Cryst. (2004) E60:m1484-M1486.

Yaghi et al., "T-Shaped Molecular Building Units in the Porous Structure of AG(4,4'-bpy)•NO₃" J. Am. Chem. Soc. (1996) 118:295-296.

Yaghi et al., "T-Shaped Molecular Building Units in the Porous Structure of AG(4,4'-bpy)•NO₃" J. Am. Chem. Soc. (1996) 118:295-296 (Supplement).

* cited by examiner

METHODS OF REMOVING PERCHLORATE FROM WATER AND VESSELS AND SYSTEMS FOR PRACTICING THE SAME

CROSS-REFERENCE TO RELATED APPLICATIONS

This application is a 371 National Phase of International Patent Application Serial No. PCT/US2016/022466 filed Mar. 15, 2016 which claims the benefit of U.S. Provisional Patent Application No. 62/134,424, filed Mar. 17, 2015, which applications are incorporated herein by reference in their entirety.

INTRODUCTION

Perchlorate ($ClO_4^-$) is an emerging trace contaminant in ground water and has gained significant attention as it has become widespread in many countries including the United States, Japan, Korea, India, Germany and China. Even at 1 ppb level, this anionic pollutant can block the uptake of iodide by the thyroid due to their equivalent charge and similar ionic radii. This blockage can disrupt the production of thyroid hormones and affect metabolism, possibly leading to hypothyroidism or mental retardation in fetuses and infants. Perchlorate salts are used as the conventional solid oxidants in the industrial manufacture of rocket fuel, explosives, flares and fireworks. Bleach and nitrate fertilizers can also contain perchlorate, and the anion also occurs naturally in arid environments.

Because of the high solubility and non-complexing nature of perchlorate, it is highly mobile in aqueous environments and strongly resistant to traditional waste water treatment technologies. The latter include adsorption, ion exchange, membrane filtration, catalytic reduction and biological remediation. Among these techniques, ion exchange resins are considered the most viable and efficient method. These matrices consist of a polystyrene backbone with terminal cationic quaternary ammonium side groups that possess an exchangeable counter-anion. They have been previously used in the attempt of separating pollutant anions such as arsenate ($AsO_4^{3-}$). These resins, however, are of limited thermal and chemical stability due to their organic polymeric nature. For example, approximately 15% of their ion exchange capacity is lost upon contact with water at 90° C., and 64% and 57% of their ion exchange capacity in the presence of sodium hypochlorite and hydrogen peroxide, respectively. A recent attempt to separate perchlorate from water using an organic resin was reported by Song et al. It was observed that such resins are significantly sensitive to pH. A perchlorate adsorption capacity of 170.4 mg/g (1.713 meq/g) could only be obtained upon treatment with a resin bed depth of 3.4 cm in a solution with an adjusted pH of 7, and the resin could only be effectively regenerated via concentrated hydrochloric acid treatment.

Layered double hydroxides (LDHs) are an isostructural set of materials consisting of cationic brucite-type layers that are charge balanced by interlayer anions with the general formula $[M^{2+}_{1-x}M^{3+}_x(OH)_2]A^-_{x/n} \cdot mH_2O$. They have been studied extensively as a possible alternative to anion exchange resins. This group of cationic materials, however, has limited capacity as evidenced by adsorption titration and isotherms. The nitrate form of Mg:Al LDH has an adsorption capacity of only 1.959 mg/g (0.0197 meq/g). In addition, selectivity of LDHs is low toward target anions due to the interfering effect of competing anions. Common anions such as carbonate, sulfate and chloride tend to deintercalate some or all of the trapped anions.

SUMMARY

Provided are methods of removing perchlorate from water. The methods include contacting water suspected of containing perchlorate with a cationic material. The cationic material includes one or more cationic metal atoms connected by an atom or molecule into an extended structure, and a charge balancing anion. The contacting removes perchlorate, if present, from the water. Water treatment vessels, systems and facilities that find use in practicing the methods of the present disclosure are also provided.

DETAILED DESCRIPTION

Figure 1:
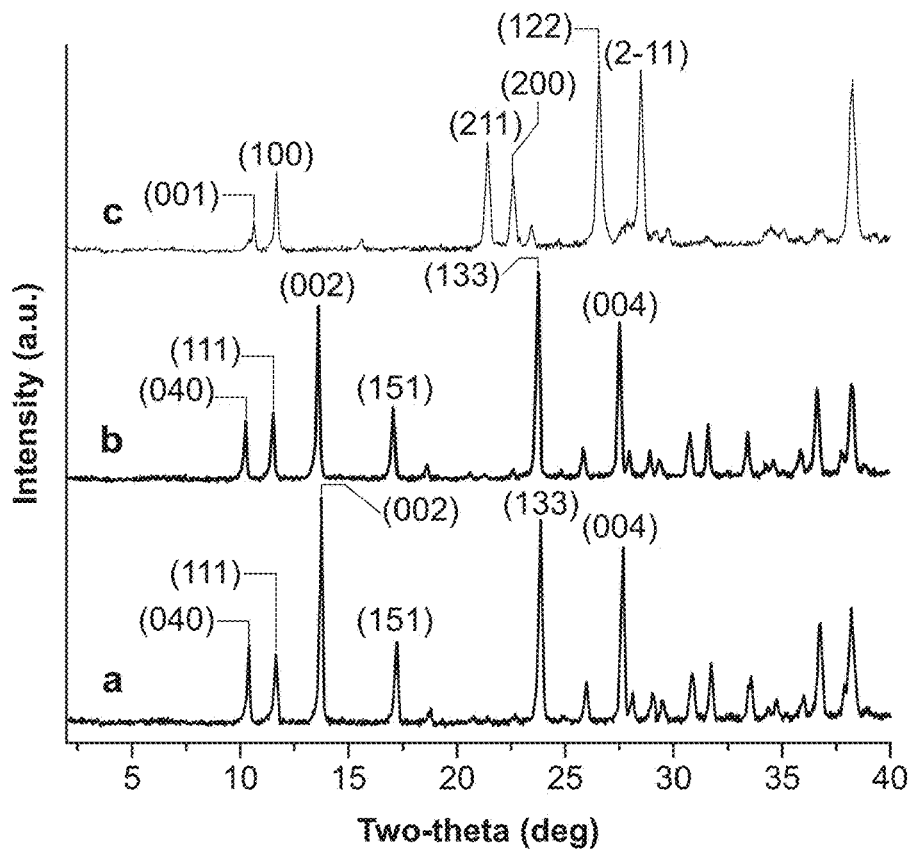
FIG. 1 shows powder X-ray diffraction (PXRD) data. (a) is the pattern for RT-SBN; (b) is the pattern for HT-SBN; (c) is the pattern for SBP.

Provided are methods of removing perchlorate from water. The methods include contacting water suspected of containing perchlorate with a cationic material. The cationic material includes one or more cationic metal atoms connected by an atom or molecule into an extended structure, and a charge balancing anion. The contacting removes perchlorate, if present, from the water. Water treatment vessels, systems and facilities that find use in practicing the methods of the present disclosure are also provided.

Before the methods, vessels and systems of the present disclosure are described in greater detail, it is to be understood that the methods, vessels and systems are not limited to particular embodiments described, as such may, of course, vary. It is also to be understood that the terminology used herein is for the purpose of describing particular embodiments only, and is not intended to be limiting, since the scope of the methods, vessels and systems will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the methods, apparatuses and systems. The upper and lower limits of these smaller ranges may independently be included in the smaller ranges and are also encompassed within the methods, vessels and systems, subject to any specifically excluded limit in the stated range. Where the stated range includes one or both of the limits, ranges excluding either or both of those included limits are also included in the methods, vessels and systems.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which the methods, vessels and systems belong. Although any methods, vessels and systems similar or equivalent to those described herein can also be used in the practice or testing of the methods, vessels and systems, representative illustrative methods, vessels and systems are now described.

All publications and patents cited in this specification are herein incorporated by reference as if each individual publication or patent were specifically and individually indicated to be incorporated by reference and are incorporated herein by reference to disclose and describe the materials and/or methods in connection with which the publications are cited. The citation of any publication is for its disclosure prior to the filing date and should not be construed as an admission that the present methods, apparatuses and systems are not entitled to antedate such publication, as the date of publication provided may be different from the actual publication date which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

It is appreciated that certain features of the methods, vessels and systems, which are, for clarity, described in the context of separate embodiments, may also be provided in combination in a single embodiment. Conversely, various features of the methods, vessels and systems, which are, for brevity, described in the context of a single embodiment, may also be provided separately or in any suitable subcombination. All combinations of the embodiments are specifically embraced by the present disclosure and are disclosed herein just as if each and every combination was individually and explicitly disclosed, to the extent that such combinations embrace operable methods, apparatuses and systems. In addition, all sub-combinations listed in the embodiments describing such variables are also specifically embraced by the present methods, vessels and systems and are disclosed herein just as if each and every such subcombination was individually and explicitly disclosed herein.

As will be apparent to those of skill in the art upon reading this disclosure, each of the individual embodiments described and illustrated herein has discrete components and features which may be readily separated from or combined with the features of any of the other several embodiments without departing from the scope or spirit of the present methods. Any recited method can be carried out in the order of events recited or in any other order that is logically possible.

Methods

As summarized above, aspects of the present disclosure include methods of removing perchlorate from water. The methods include contacting water suspected of containing perchlorate with a cationic material. The cationic material includes one or more cationic metal atoms connected by an atom or molecule into an extended structure, and a charge balancing anion. The contacting removes an amount of perchlorate (e.g., all, or less than all), if present, from the water.

According to certain embodiments, the cationic material is a metal-organic framework (MOF) material (also known as a "coordination polymer"). When the cationic material is a MOF material, the MOF material may be a one-dimensional MOF material (e.g., a polymer), a two-dimensional MOF material (e.g., a layered material), or a three-dimensional MOF material.

The cationic material includes one or more cationic metal atoms. The term "one or more cationic metal atoms" means a single cationic metal atom, a dimer of cationic metal atoms, a dimer of a cationic metal atom and a neutral metal atom, or a cluster of three or more metal atoms that includes at least one cationic metal atom (e.g., one, two, three, four, five, or more cationic metal atoms). According to certain embodiments, when the one or more cationic metal atoms is a cluster of three or more metal atoms that includes at least one cationic metal atom, the cluster includes one or more neutral metal atoms. Two or more metal atoms in a cluster may be connected by another element, such as oxygen.

Cationic metals of interest include, but are not limited to, transition (d-block) metals, rare earth f-block metals, main group p-block metals, s-block alkali or alkaline earth metals, and the like. In certain aspects, the cationic metal is a Group 11 metal, such as Ag (e.g., in an oxidation state of 0 or 1), Cu (e.g., in an oxidation state of 0, 1, or 2), or Au (e.g., in an oxidation state of 0, 1, or 3). For example, the cationic metal may be Ag(I). According to certain embodiments, the cationic material includes more than one type of metal, e.g., more than one type of Group 11 metal (such as Ag and Cu), two or more d-block metals (such as Co (e.g., in an oxidation state of 0, 2, or 3) and Zn (e.g., in an oxidation state of 0 or 2)), or any other suitable combination of metals. In certain aspects, the cationic metal is Fe (e.g., in an oxidation state of 0, 2 or 3), or Ni (e.g., in an oxidation state of 0, 2 or 3).

The one or more cationic metal atoms are connected by an atom or molecule into an extended structure. Any atom or molecule suitable for connecting the one or more cationic metal atoms into an extended structure may be employed. In certain aspects, the atom or molecule is an organic moiety. Organic moieties of interest include, but are not limited to, organic ligands. By "organic ligand" is meant an organic molecule that binds to a central metal atom (or two or more metal atoms, such as a dimer of metal atoms or cluster of three or more metal atoms) to form a coordination complex. The bonding between metal and ligand may involve the formal donation of one or more of the ligand's electron pairs. The nature of metal-ligand bonding can range from covalent to ionic. In certain aspects, the organic ligand is a non-cyclic organic ligand. In other aspects, the organic ligand is a cyclic organic ligand, which cyclic organic ligand may include one or more (e.g., 1, 2, 3, 4, 5, 6, etc.) ring structures. According to certain embodiments, the one or more ring structure(s) are independently selected from 3-membered ring structures, 4-membered ring structures, 5-membered ring structures, 6-membered ring structures, 7-membered ring structures, and any combination thereof.

In certain aspects, when the organic ligand is a cyclic ligand, the cyclic ligand is a bicyclic ligand. According to one embodiment, the bicyclic ligand is bipyridine (bipy). The bipyridine may be a regioisomer of bipyridine selected from 2,2'-bipyridine, 2,3'-bipyridine, 2,4'-bipyridine, 3,3'-bipyridine, 3,4'-bipyridine, and 4,4'-bipyridine. For example, the atom or molecule that connects the cationic metal into an extended structure may be 4,4'-bipyridine.

The cationic material includes a charge balancing anion. Any anion suitable for balancing the charge of the one or more cationic metal atoms connected by the atom or molecule may be employed. In certain aspects, the charge balancing ion is $NO_3^-$. In other aspects, the charge balancing ion is acetate ($CH_3CO_2^-$, $C_2H_3O_2^-$ or $CH_3COO^-$). In other aspects, the charge balancing anion is $ClO_4^-$, triflate, $PF_6^-$, $BF_4^-$, $SO_4^{2-}$, $AsO_4^{3-}$, $AsO_3^{3-}$, $Mn/Tc/ReO_4^-$, $Cr/MoO_4^{2-}$, $Cr_2O_7^{2-}$, $CO_3^{2-}$, halide ($X^-$, where X=F, Cl, Br and I), an organosulfonate (such as ethanesulfonate), an organodisulfonate (such as α,ω-1,2-ethanedisulfonate), or a radioactive rare earth metal (e.g., $PuO_4^{2-}$ or the like).

According to certain embodiments, the cationic material is $[Ag(I)\text{-bipy}^+][NO_3^-]$ (also referred to herein as silver 4,4'-bipyridine nitrate, or SBN). As demonstrated in the Experimental section below, the present inventors have surprisingly found that this example cationic material is effective for selective capture of ppm level perchlorate from water in record capacity via complete anion exchange, forming $[Ag\text{-bipy}^+][ClO_4^-]$ (also referred to herein as silver 4,4'-bipyridine perchlorate, or SBP). The exchange was complete within 90 minutes and the capacity was 354 mg/g, representing 99% perchlorate removal. These values are far greater than current anion exchangers such as AMBERLITE™ resin (249 mg/g) and layered double hydroxides (28 mg/g). 96% regeneration of SBN was accomplished in nitrate solution. New crystals are formed for each exchange step (FIG. 6). The SBN solid is thus reformed after each cycle, allowing indefinite cycling for perchlorate. Seven cycles were shown as proof of concept.

When the cationic material is $[Ag(I)\text{-bipy}^+][NO_3^-]$, in certain aspects, the present disclosure provides methods of synthesizing $[Ag(I)\text{-bipy}^+][NO_3^-]$. Example approaches for synthesizing $[Ag(I)\text{-bipy}^+][NO_3^-]$ are provided in the Experimental section below. Synthetic approaches include synthesis at room temperature, reflux, hydrothermal synthesis, and the like. Accordingly, in certain aspects, the cationic material employed in the subject methods is room temperature-synthesized $[Ag(I)\text{-bipy}^+][NO_3^-]$, hydrothermally-synthesized $[Ag(I)\text{-bipy}^+][NO_3^-]$, or a combination thereof.

The methods of the present disclosure may be used to treat any type of water from which it is desirable to remove perchlorate. Non-limiting examples of the types of water from which perchlorate may be removed using the methods of the present disclosure include ground water, surface water, waste water, municipal water, well water and atmospheric water. Ground water is water located beneath the earth's surface, e.g., in soil pore spaces, fractures of rock formations and the like. According to certain embodiments, the water is ground water originating from an aquifer. Surface water is water on the earth's surface, such as in a stream, river, lake, wetland, ocean, or surface runoff. Waste water is any water that has been adversely affected in safety and/or quality by anthropogenic influence, e.g., human activity. The water may be of more than one of the above-described types of water. For example, waste water may also be surface water, e.g., contaminated surface runoff, where the contamination is the result of human activity.

According to certain embodiments, the water from which perchlorate is removed using the methods of the present disclosure is water originating from a Superfund site. A Superfund site is a site that is subject to the U.S. Environmental Protection Agency's Superfund program. Superfund sites are listed on the publicly available National Priorities List (NPL).

In certain aspects, the water from which perchlorate is removed using the methods of the present disclosure is water contaminated with perchlorate as a result of the manufacture or use of liquid and/or solid rocket propellants (e.g., as a result of the washing of used liquid and/or solid propellant rockets). According to certain embodiments, such contaminated water is from a Superfund site.

According to certain embodiments, prior to the contacting step, the methods include determining whether or not the water contains perchlorate. Such a determination may be made by any convenient perchlorate detection approach and may include determining the concentration of perchlorate, if present, in the water, e.g., expressed as parts per million (ppm), parts per billion (ppb) or the like. Suitable approaches for determining whether perchlorate is present in the water suspected of containing perchlorate include, but are not limited to, ion chromatography. In certain aspects, prior to the contacting step, the water suspected of containing perchlorate is determined to contain perchlorate. According to certain embodiments, the water determined to contain perchlorate is present at a concentration of 200 ppm or less, including 150 ppm or less, 100 ppm or less, 50 ppm or less, 1 ppm or less, 900 ppb or less, 800 ppb or less, 700 ppb or less, 600 ppb or less, 500 ppb or less, 400 ppb or less, 300 ppb or less, 200 ppb or less, 100 ppb or less, 50 ppb or less, 25 ppb or less, 10 ppb or less, 9 ppb or less, 8 ppb or less, 7 ppb or less, 6 ppb or less, 5 ppb or less, 4 ppb or less, 3 ppb or less, 2 ppb or less, or 1 ppb or less.

According to the subject methods, the water suspected of containing perchlorate is contacted with the cationic material. The manner in which the water is contacted with the cationic material may vary. In certain aspects, the cationic material is present in a porous form (e.g., a membrane, mesh, filter, or the like) such that the contacting may include flowing the water through the cationic material, or alternatively (or in addition to) contacting the water with the porous form of cationic material in a non-flowing (e.g., static, non-stirring, etc.) manner. The cationic material may also be present in a non-porous form (crystals, powder, nanoparticles, etc.), in which case the contacting may include flowing the water around the cationic material, or contacting the water with the non-porous form of cationic material in a non-flowing manner. According to certain embodiments, the cationic material is present in a mixture of materials, where the mixture facilitates the flow of water through or around the material. For example, in addition to the cationic material, the mixture of materials may include, e.g., inert materials, such as inert beads (e.g., silica beads, polymer beads or sand), which in certain aspects facilitates the flow of the water through or around the mixture.

The methods may further include regenerating the cationic material, e.g., upon completion or substantial completion of ion exchange. Approaches for regenerating the material may vary. In certain aspects, regenerating the cationic material includes contacting the perchlorate-containing cationic material with a regenerant (e.g., a regenerant solution) that includes another anion. Such a contacting step completes one perchlorate-charge balancing anion cycle. According to one embodiment, the anion in the regenerant is the charge balancing anion present in the original cationic material. For example, when the charge balancing anion present in the original cationic material is nitrate (e.g., when the original cationic material is $[Ag(I)\text{-bipy}^+][NO_3^-]$), regenerating the cationic material may include contacting the perchlorate-containing cationic material with a solution that includes $NO_3^-$, including but not limited to, an $NaNO_3$ solution. In other aspects, regenerating the cationic material includes contacting the perchlorate-containing cationic material with a regenerant that includes a charge balancing anion other than the anion present in the original cationic material. For example, the charge balancing ion of the cationic material may be toxic at a concentration (e.g., a concentration in the ppm to ppb range), and the regenerant may be selected such that it includes a charge balancing ion that is less toxic than the original anion, or non-toxic, at the concentration. Suitable charge balancing anions that may be present in the regenerant for reduced toxicity relative to the original anion include, but are not limited to, carbonate ($CO_3^{2-}$), bicarbonate ($HCO_3^-$) or acetate ($CH_3CO_2^-$).

According to certain embodiments, the methods include regenerating the cationic material once, 2 times or more, 3 times or more, 4 times or more, 5 times or more, 6 times or more, 7 times or more, 8 times or more, 9 times or more, 10 times or more, 15 times or more, 20 times or more, 50 times or more, or 100 times or more.

When the methods include regenerating the cationic material, the methods may further include contacting water suspected of containing perchlorate with the regenerated cationic material, e.g., to remove perchlorate from water using the regenerated cationic material.

In certain aspects, after the contacting step, the methods of the present disclosure include reducing the perchlorate in the cationic material. Any suitable approach for reducing the perchlorate may be employed. According to certain embodiments, the perchlorate is reduced by contacting the perchlorate-containing cationic material with a microorganism (e.g., bacteria) capable of reducing perchlorate. Perchlorate-reducing bacteria (PCB) that find use in the methods include, but are not limited to, *Dechloromonas* (e.g., *Dechloromonas* PC1), *Dechlorosoma* (also known as "*Azospira*", e.g., *Azospira oryzae*), *Rhodobacter capsulatus*, *Rhodobacter sphaeroides*, halophilic archaea *Haloferax denitrificans*, *Paracoccus halodenitrificans*, and *A. denitrificans* strain BC. PCBs that find use in practicing the methods include, but are not limited to, those described in Birdiya & Bae (2011) *Microbiological Research*, 166(4):237-254.

The methods are effective for removing a percentage of perchlorate from the water. The percentage of perchlorate removed from the water, according to certain embodiments, is 50% or more, 60% or more, 70% or more, 80% or more, 85% or more, 90% or more, 95% or more, or 99% or more.

The methods of the present disclosure may be performed at any suitable temperature, including ambient temperature (e.g., from 60 to 75 degrees Fahrenheit).

According to certain embodiments, the subject methods are effective at removing anionic contaminants in addition to perchlorate from water, such as chromate, dichromate, pertechnetate, arsenate, selenite, selenate, uraniate, plutoniate and/or the like.

Water Treatment Vessels, Systems and Facilities

Aspects of the present disclosure include water treatment vessels. The vessels include a cationic material, where the cationic material includes one or more cationic metal atoms connected by an atom or molecule into an extended structure, and a charge balancing anion. The cationic material present in the water treatment vessel may be any of the cationic materials described elsewhere herein, such as any of the cationic materials described in the Methods section above or the Experimental section below. According to one embodiment, the cationic material is $[Ag(I)\text{-bipy}^+][NO_3^-]$.

By "water treatment vessel" is meant any vessel suitable for containing water suspected of being contaminated (e.g., with perchlorate, chromate, pertechnetate, arsenate, and/or the like) in a manner sufficient for the cationic material to remove the contaminant(s) from the water.

According to certain embodiments, the water treatment vessel is adapted for treatment of water by the cationic material in a non-flowing manner. For example, the vessel may be a bottle, flask, holding tank, or the like.

In other aspects, the water treatment vessel is adapted for treatment of water by the cationic material in a flowing manner (e.g., gravity flow, flow created by establishing a pressure differential between an inlet and an outlet of the vessel, etc.). Such vessels include flow columns or any other vessel adapted for water to flow into, and out of, the vessel in a manner effective for removal of one or more contaminants (e.g., perchlorate) from the water by the cationic material therein.

The water treatment vessels of the present disclosure may include one or more openings, optionally with one or more associated valves. When the vessels include one or more valves, the valves may be manually controlled or electronically controlled. For example, a vessel may include a valve selected from the group consisting of: a valve for admitting water suspected of being contaminated into the vessel; a valve for removing from the vessel water from which a contaminant (e.g., perchlorate) has been removed; a valve for admitting a regenerant (e.g., a solution containing a charge balancing anion present in the original cationic material, such as a $NO_3^-$-containing regenerant when the original cationic material is $[Ag(I)\text{-bipy}^+][NO_3^-]$); a valve for admitting a regenerant rinse liquid into the vessel; a valve for removing a regenerant rinse liquid; and any combination thereof, including each of such valves. When the valves are electronically controlled, the valves may be operatively coupled to an electrical controller that directs the opening and closing of the electrically controlled valves in any desired sequence. In certain aspects, the water treatment vessel is adapted for continuous removal of perchlorate from water, e.g., the vessel may include valves that are electronically controlled such that perchlorate contaminated water is flowed into the vessel, purified water is flowed out of the vessel, regenerant is flowed into the vessel, regenerant is flowed out of the vessel, a regenerant rinse solution is flowed into the vessel, the regenerant rinse solution is flowed out of the vessel, perchlorate contaminated water is flowed into the vessel, etc.

Also provided are water treatment systems. According to certain embodiments, the systems of the present disclosure include one or more of the water treatment vessels of the present disclosure. For example, the water treatment system may include 1, 2 or more, 3 or more, 4 or more, 5 or more, 10 or more, 15 or more, 20 or more, 50 or more, 75 or more, or 100 or more of the water treatment vessels of the present disclosure.

When the water treatment system includes 2 or more water treatment vessels, the system may be adapted such that treatment vessels remove contaminants (e.g., perchlorate) from water in series (or sequentially) or in parallel. When the water treatment system includes 2 or more water treatment vessels, the system may be adapted such that the vessels are at different steps of a contaminant removal procedure at a point in time. For example, at a point in time, a first vessel of the system may be at a step of contacting water suspected of containing perchlorate with the cationic material, while a second vessel of the system may be at a step of regenerating the cationic material to prepare the material for a subsequent contacting step.

The subject water treatment systems may include water treatment components in addition to the water treatment vessel(s), including plumbing for delivering one or more fluids to the water treatment vessel(s), such as the water from which perchlorate is to be removed, regenerant solutions, regenerant rinse solutions, and/or the like. The systems may also include other components useful in the treatment of water, such as filters for filtering particles from the water before and/or after the water is treated in the water treatment vessel(s), components for sterilizing the water (e.g., a UV lamp, ozone producing component, or other suitable water sterilization component) for sterilizing the water before and/or after the water is treated in the water treatment vessel(s), a component for aerating the water, a desalination component for removing one or more salts from the water, a coagulation component for flocculating particulates present in the water, and any combination thereof.

In certain aspects, the water systems of the present disclosure are adapted to produce potable water, such as water that meets the water quality standards set by the Environmental Protection Agency (EPA) pursuant to the Safe Drinking Water Act (SDWA). For example, the subject water systems may be adapted, in addition to removing perchlorate, for removal of one or more microorganisms (e.g., Cryptosporidium, Giardia lamblia, Legionella, coliform bacteria, enteric viruses, etc.), one or more disinfectants (e.g., chlorine, chloramine and chlorine dioxide), one or more disinfection byproducts (e.g., bromate, chlorite, haloacetic acids and trihalomethanes), one or more inorganic chemicals (e.g., antimony, arsenic, asbestos, barium, beryllium, cadmium, chromium, copper, cyanide, fluoride, lead, mercury, nitrate, nitrite, selenium, thallium, etc.), one or more organic chemicals (e.g., benzene, dioxin (2,3,7,8-TCDD), polychlorinated biphenyl (PCB), styrene, toluene, vinyl chloride, pesticides, etc.), one or more radionuclides (e.g., alpha particles, beta particles and photon emitters, radium, uranium, etc.), and any combination thereof.

Also provided are water treatment facilities. According to certain embodiments, a water treatment facility of the present disclosure includes a water treatment vessel of the present disclosure, which water treatment vessel is optionally present in a water treatment system of the present disclosure. In certain aspects, the water treatment facility is present on or near a Superfund site subject to the U.S. Environmental Protection Agency's Superfund program. According to some embodiments, the water treatment facility is present on or near a site (e.g., Superfund site) that includes water contaminated with perchlorate as a result of the manufacture or use of liquid and/or solid rocket propellants (e.g., as a result of the manufacture of liquid and/or solid propellant rocket engines).

Utility

The methods, vessels, systems and facilities of the present disclosure find use in a variety of applications, including any application in which it is desirable to remove perchlorate from water. Trace perchlorate contamination in ground water, for example, has become widespread in many countries including the United States, Japan, Korea, India, Germany, France, and China. This pollutant can disrupt the production of thyroid hormones and affect metabolism, which may result in hypothyroidism and possibly mental retardation in fetuses and infants.

Current technologies for removing perchlorate from water include polymer exchange resins and layered double hydroxide (LDH) materials. Compared to such existing approaches, the methods and vessels of the present disclosure according to certain embodiments exhibit significantly higher uptake capacity for perchlorate, enable recyclability (in terms of both capacity and ease), exhibit improved selectivity for perchlorate trapping over other anions, exhibit rapid uptake of perchlorate, and allow convenient approaches for synthesis (e.g., room temperature synthesis and exchange) of the material in excellent yield.

Kits

Aspects of the present disclosure include kits. According to certain embodiments, the kits are water treatment kits that find use, e.g., for the removal of perchlorate and any other contaminants of interest from water. A water treatment kit of the present disclosure may include any of the cationic materials described elsewhere herein, including but not limited to, $[Ag(I)\text{-bipy}^+][NO_3^-]$. The cationic material may be provided in the kit in a suitable packaging, e.g., a packaging in which the cationic material is stable for a suitable duration of time. In certain aspects, the water treatment kits include two or more packages of the cationic material.

According to certain embodiments, a water treatment kit of the present disclosure includes a water treatment vessel. The vessel may include the cationic material, or be provided separately from the cationic material. The vessel may be any vessel suitable for the removal of contaminants (e.g., perchlorate) from water, including any of the water treatment vessels described elsewhere herein.

Any other components or reagents useful for the treatment of water may be included in the subject kits. Components of the kits may be present in separate containers, or multiple components may be present in a single container.

In certain aspects, a water treatment kit of the present disclosure includes instructions for using the cationic material to remove perchlorate from water, and optionally, for regenerating the cationic material so that it may be used two or more times. The instructions may be recorded on a suitable recording medium. For example, the instructions may be printed on a substrate, such as paper or plastic, etc. As such, the instructions may be present in the kits as a package insert, in the labeling of the container of the kit or components thereof (i.e., associated with the packaging or sub-packaging), etc. In other embodiments, the instructions are present as an electronic storage data file present on a suitable computer readable storage medium, e.g., portable flash drive, DVD, CD-ROM, diskette, etc. In yet other embodiments, the actual instructions are not present in the kit, but means for obtaining the instructions from a remote source, e.g. via the internet, are provided. An example of this embodiment is a kit that includes a web address where the instructions can be viewed and/or from which the instructions can be downloaded. As with the instructions, the means for obtaining the instructions is recorded on a suitable substrate.

The following example is offered by way of illustration and not by way of limitation.

Experimental

Reversible Trapping of Perchlorate from Water by a Cationic Framework

Metal-organic frameworks (MOFs, also known as coordination polymers) are an emerging class of materials with a now vast array of topologies and properties of interest including gas storage, gas separation, drug delivery and ion exchange. Cationic MOFs are a subgroup of these compounds, where positive metal centers are connected by neutral organic linkers or neutral metal centers are connected by positive organic linkers. The overall cationic charge of the host necessitates charge-balancing extra-framework anions in the pores/interlayer/interpolymer spaces, depending on the MOF dimensionality. If the host-guest interaction is weak, anion exchange may occur if the framework does not collapse in the process. Alternatively, the crystals may dissolve and a new MOF solid is formed containing the incoming anion. A selective anion exchange separation process using a cationic indium-based MOF $[In_3O(COO)_6^+]$ was recently demonstrated. The material reversibly captures organic dye anions of varying charge from a dimethylformamide (DMF) non-aqueous solvent. Also developed is an anion separation approach in aqueous systems by the selective crystallization of chloride, bromide or iodide into one-dimensional cationic MOFs even in the presence of competing oxo-anions such as nitrate and sulfate. The anion selectivity is governed by the anion size, coordinating ability and the overall packing efficiency of the MOF.

In this example, the perchlorate trapping profile of the cationic MOF, $[Ag-bipy^+][NO_3^-]$ (silver 4,4'-bipyridine nitrate, SBN), is demonstrated. The material traps perchlorate quantitatively in far greater capacity, speed and reversibility compared to existing resins and LDHs.

Materials and Methods

Materials

Silver nitrate ($AgNO_3$, Fisher, 99%), 4,4'-bipyridine [$(C_5H_4N)_2$, Acros Organics, 98%] were used as-received for the synthesis. Sodium nitrate ($NaNO_3$, Fisher, 99%), sodium perchlorate monohydrate ($NaClO_4 \cdot H_2O$, Fluka Analytical, 98%), AMBERLITE™IRA-400 resin (Sigma-Aldrich), and hydrotalcite [$Mg_6Al_2(CO_3)(OH)_{16} \cdot 4H_2O$, Aldrich Chemistry] were used as-purchased for the anion exchange reactions.

Synthesis

Figure 5:
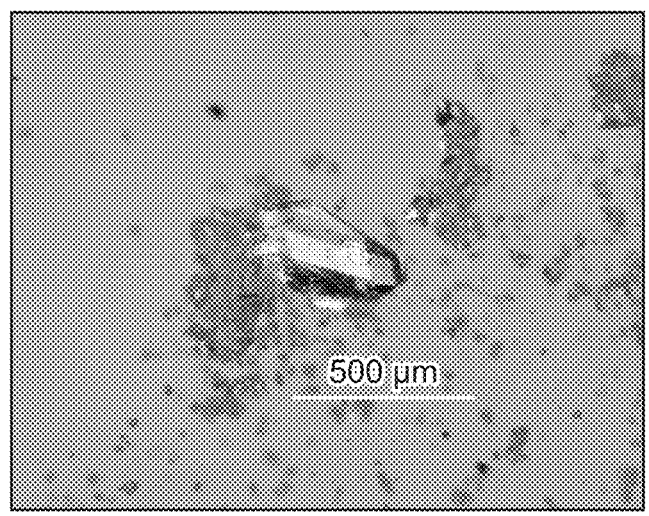
FIG. 5 provides an optical micrograph of HT-SBN.

Pale gray parallel-piped crystals of SBN 400 to 600 μm in length were synthesized hydrothermally (HT-SBN, FIG. 5). Alternatively, room temperature conditions (RT-SBN) yielded a microcrystalline powdered material consisting of 4 to 10 μm average sized blocks (FIG. 6). For HT-SBN, a mixture of $AgNO_3$ (0.1 g, 0.59 mmol), 4,4'-bipyridine (0.1 g, 0.64 mmol) and deionized water (10 mL) was stirred at room temperature for 10 min and then transferred to a 15 mL Teflon lined autoclave to ⅔ filling. The autoclave was placed in a programmable oven and heated at 140° C. for 10 h, then cooled to 110° C. for 8 h, followed by further cooling to 90° C. for 6 h and finally cooling to room temperature at a rate of 0.1° C./min. Pale gray crystals were isolated after filtration and rinsed with water and acetone (yield: 0.181 g, 94.3% based on silver nitrate). The synthesis of RT-SBN crystals was carried out by simply stirring the reactants in the same ratio for 3 days in a sealed beaker and filtered in the same manner (yield: 0.187 g, 97.6% based on silver nitrate).

Perchlorate Exchange

Batch experiments were carried out under ambient conditions by simply placing 80 mg (0.25 mmol) of as-synthesized RT- or HT-SBN material previously ground using a mortar and pestle into a beaker containing 50 mL deionized water and $NaClO_4$ (35 mg, 0.25 mmol). The anion exchange solution was sealed and stirred mildly. The exchange solution was analyzed by taking liquid aliquots at various time intervals to quantify the residual perchlorate concentration by ion chromatography (IC). The post-exchange crystalline silver 4,4'-bipyridine perchlorate (SBP) product was recovered by vacuum filtration and rinsed with water and acetone prior analysis by powder X-ray diffraction (PXRD).

Selectivity Tests

Selectivity batch tests were performed by introducing 65.2 mg (0.2 mmol) of RT-SBN material into a sealed beaker containing 50 ml $H_2O$ and 42 mg (0.3 mmol) $NaClO_4$. The beaker also contained either 0.84 g (10 mmol) $NaHCO_3$ or 1.42 g (10 mmol) $NaSO_4$ (50-fold molar excess). The selectivity reactions were mildly stirred for 2 h under ambient conditions and the filtrate was analyzed by ion chromatrography (IC) to quantify the residual perchlorate concentration.

SBN Regeneration

Upon completion of ion exchange, the solid crystalline SBP material was placed into a 0.1 M $NaNO_3$ solution and mechanically stirred at room temperature or in an oil bath at 70° C. The percent regeneration was evaluated by measuring the increase of perchlorate concentration and the decrease in nitrate concentration in the regeneration solution via IC and by the PXRD peak area of the main (002) and (100) peak for SBN and SBP, respectively.

Instrumental

PXRD was measured on a Rigaku Americas Miniflex Plus diffractometer, scanning from 2 to 40° (2θ) at a rate of 2°·min$^{-1}$ with a 0.04° step size, under Cu Kα radiation ($\lambda$=1.5418 Å). Ion chromatography (IC) analysis was performed to assess perchlorate concentration using a Dionex ICS-3000 with an IonPac AS20 and a detection limit of 3 μg/L (ppb). Thermogravimetric analysis (TGA) was performed on a TA Instruments 2050 TGA, heating from 25 to 600° C. under Ar purge with a gradient of 15° C./min. Scanning electron microscopy (SEM) data were collected with a FEI Quanta 3D Dualbeam microscope.

Results and Discussion

SBN Synthesis

Figure 6A:
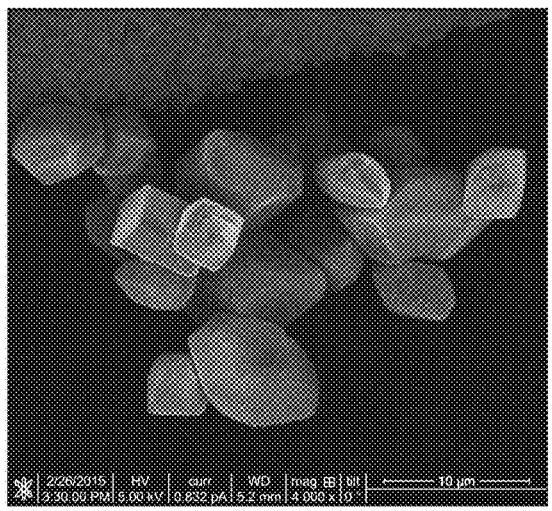
FIG. 6, Panels A-D provide SEM images for as-synthesized and regenerated SBN crystals, as well as SBP crystals produced according to certain embodiments of the present disclosure.
Figure 6B:
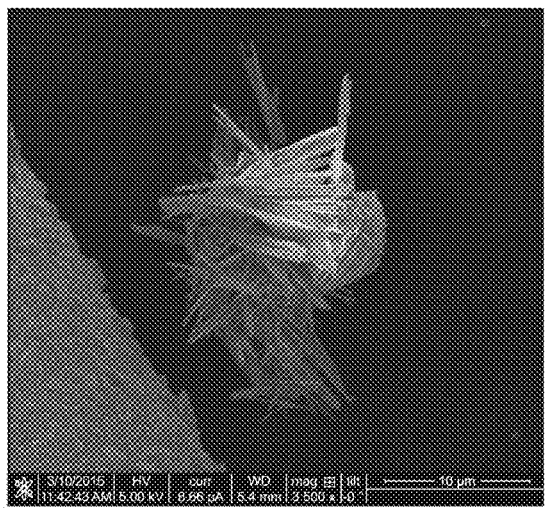

Crystals of HT-SBN were synthesized hydrothermally to produce pale gray crystals of uniform size ranging from 400-600 μm and parallelepiped morphology (FIG. 5). Room temperature synthesis of RT-SBN resulted in smaller crystals with average width of 4 to 10 μm (FIG. 6a). Both synthetic methods result in excellent, highly crystalline yields of 94.3% and 97.6% for HT-SBN and RT-SBN, respectively. PXRD confirms that both methods yield the identical phase and match the theoretical pattern based on the single crystal solution (FIGS. 1a and 1b).

Perchlorate Capture

Figure 6C:
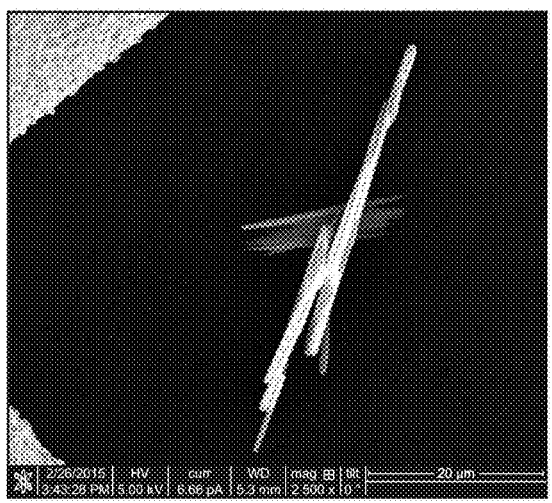
Figure 6D:
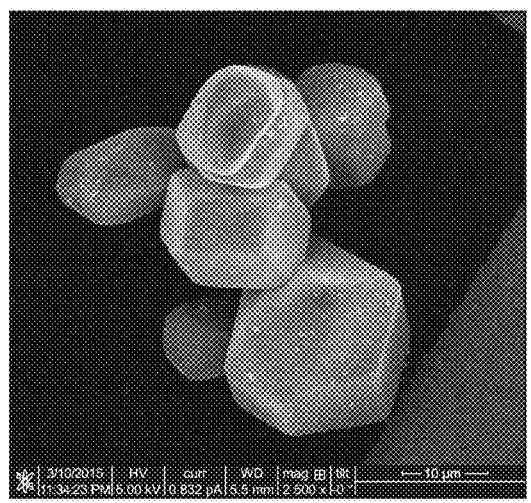
Figure 7:
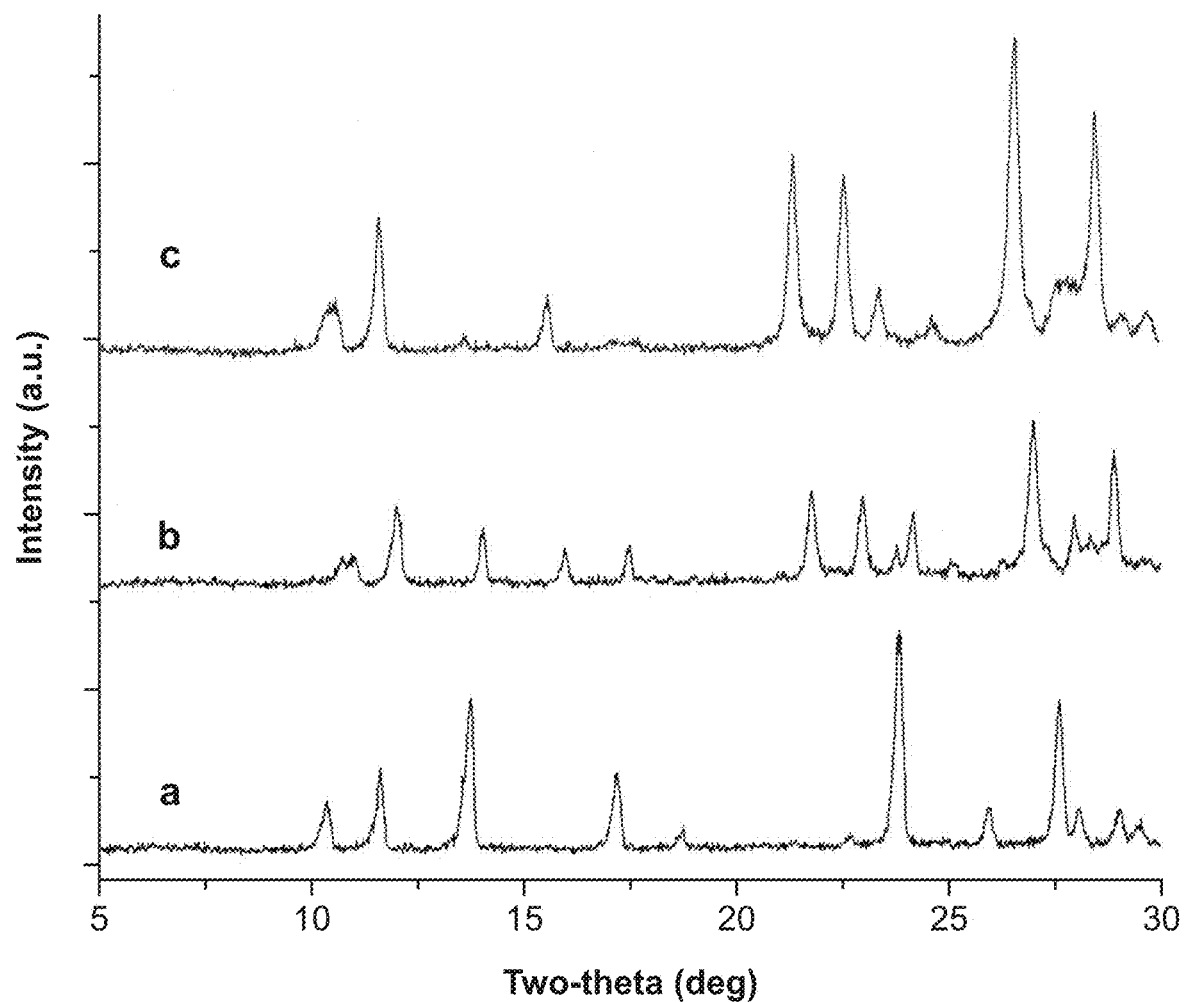
FIG. 7 provides data showing PXRD of SBN perchlorate trapping kinetics: (a) SBN pre-exchange; (b) SBN/SBP mixture after 20 minutes of exchange; (c) SBP after 70 minutes exchange.

Considering that SBN has weakly bound nitrate anions between the cationic Ag(I)-bipy chains (see "Structural Considerations" section below), anion exchange batch tests were performed to capture perchlorate. For the RT-SBN material, the adsorption capacity was 354.0 mg $ClO_4^-$/g, accounting for 99% $ClO_4^-$ removal (Table 1). On the other hand, the hydrothermally synthesized material displayed a lower adsorption capacity of 269.7 mg $ClO_4^-$/g, representing 82% perchlorate removal. The PXRD of both solid materials after exchange match the theoretical structure of SBP (FIG. 1 (c)). RT-SBN has a higher uptake due to its smaller particle size and thus higher surface area compared to HT-SBN. SEM shows the partial morphology change from SBN blocks to SBP needles after 20 min exposure to perchlorate (FIG. 6B), with only SBP needles present after 70 min (FIG. 6C). PXRD confirms that both structures are present after 20 min of exchange and that SBP is phase-pure after 70 min (FIG. 7).

In addition to an exceptionally high adsorption capacity and ambient conditions for both the synthesis and exchange, RT-SBN exhibits highly selective perchlorate capture in the presence of multiple-fold excess of potentially competing common anions. The issue of selectivity is an ongoing problem for LDHs due to the high affinity of the cationic layers for carbonate as well as other anions including sulfate, hydroxide and chloride. The selectivity of RT-SBN for perchlorate uptake over carbonate and sulfate was demonstrated by performing two separate batch tests containing 50-fold molar excess of each anion. In both tests it was found that the competing anions did not interfere with the uptake of perchlorate: adsorption capacities remained at the high levels of 337 and 342 mg $ClO_4^-$/g RT-SBN from the carbonate and sulfate batch tests, representing 95% and 97% perchlorate removal, respectively.

Figure 2:
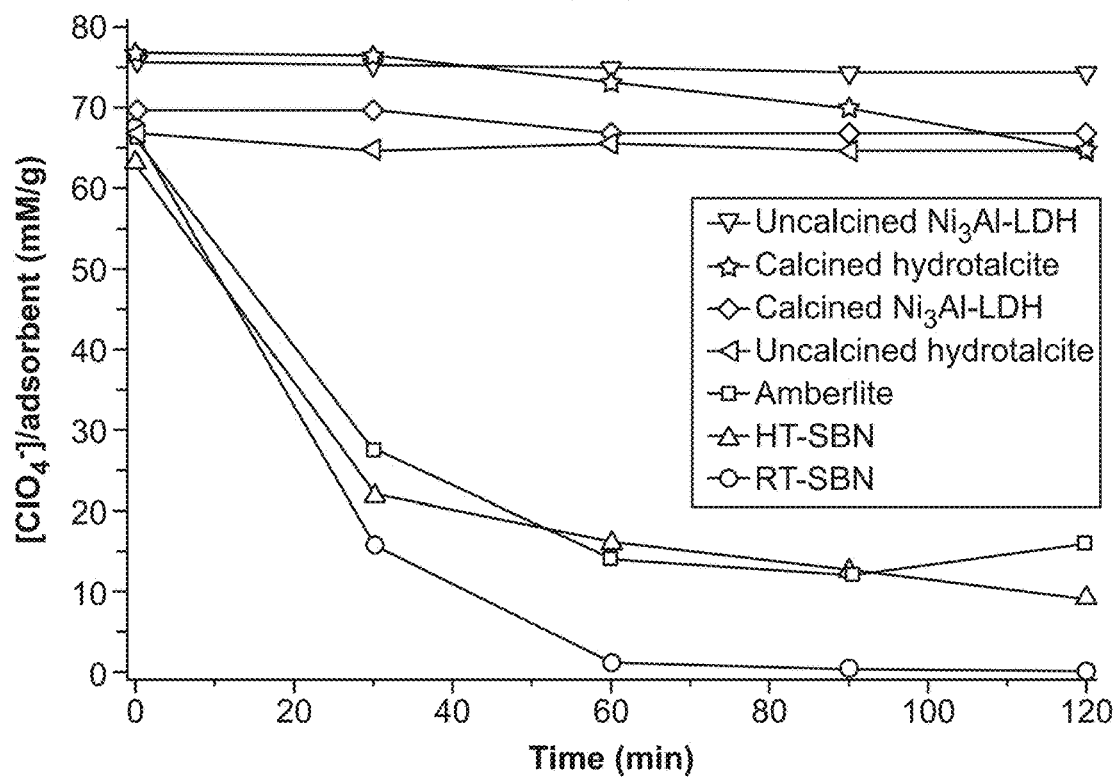
FIG. 2 shows perchlorate uptake per gram of solid versus time: RT-SBN (squares), HT-SBN (triangles), AMBERLITE™ resin (squares), uncalcined hydrotalcite (triangles), calcined hydrotalcite (stars), uncalcined $Ni_3Al$-LDH (triangles) and calcined $Ni_3Al$-LDH (diamonds).
Figure 13:
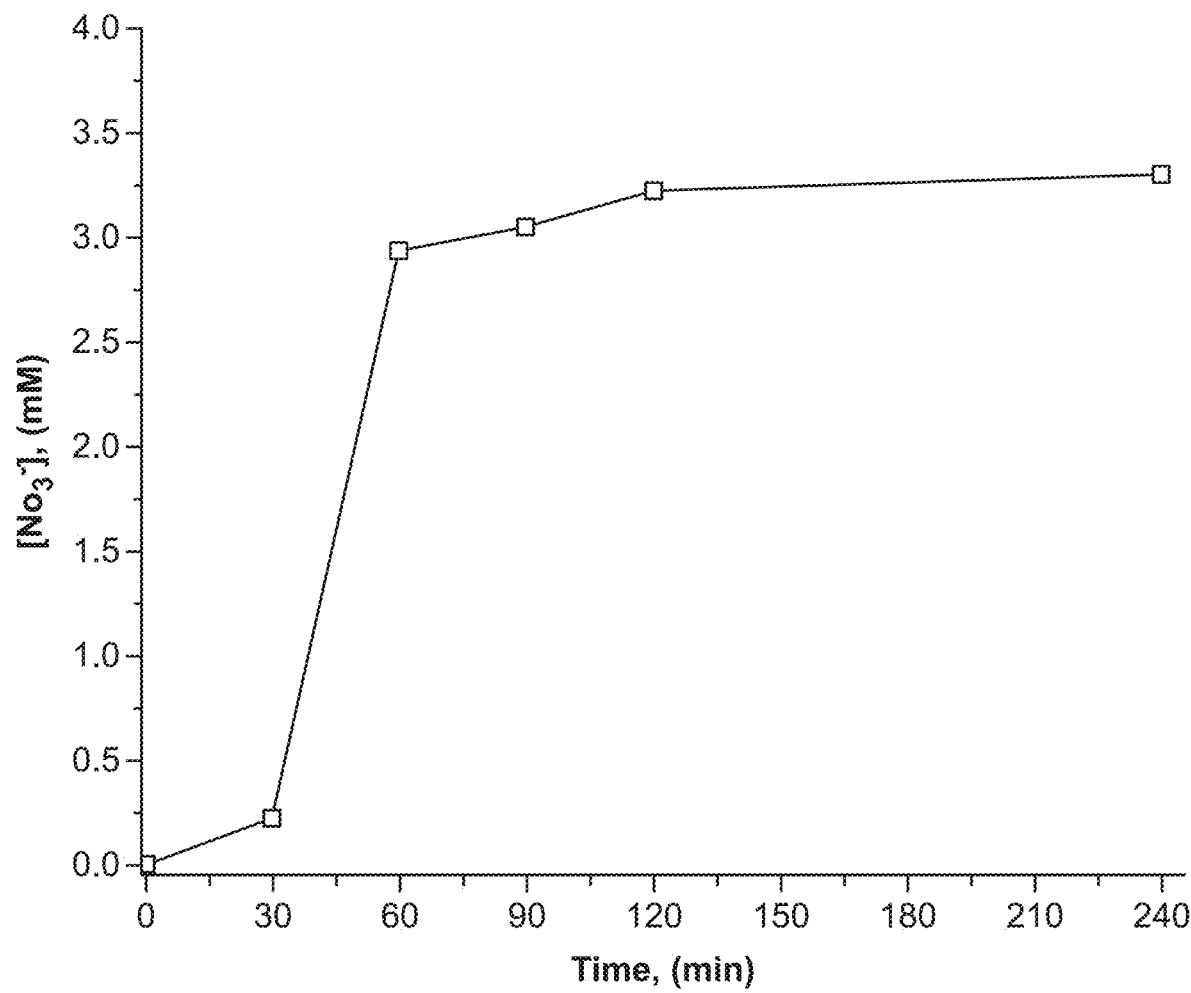
FIG. 13 depicts SBN nitrate release versus time for stoichiometric anion exchange with perchlorate.

The kinetics of perchlorate uptake by SBN were analyzed and compared to the performance of the commercially available anion exchange resins AMBERLITE™ IRA-400 resin and Purolite A530E resin, as well as the calcined and uncalcined forms of hydrotalcite [$Mg_6Al_2(CO_3)(OH)_{16} \cdot 4H_2O$] and $Ni_3Al$-LDH. The latter was tested because it adsorbs in higher capacity than hydrotalcite for some anions including pertechnetate ($TcO_4^-$). All batch experiments were performed under the same conditions using equivalent stoichiometric amounts of the anion exchanger. The kinetic plots underscore the outstanding performance of both RT- and HT-SBN (FIG. 2). A rapid decrease of approximately 98% of the perchlorate concentration was observed within 60 min for RT-SBN and 75% for HT-SBN. This rapid perchlorate trapping can be further understood by following the kinetics of the nitrate released by SBN (FIG. 13). The plot reaches a plateau after 90 min, corresponding to the stoichiometric amount of perchlorate exchanged into SBN. In the case of the other anion exchangers, only the AMBERLITE™ resin showed a significant perchlorate uptake in 60 min, with 76% removed. After 90 min, the values were 100% for RT-SBN and 78% for AMBERLITE™ resin. Both calcined hydrotalcite and $Ni_3Al$-LDH displayed a low perchlorate uptake of 4 to 12%. This lower affinity for the LDHs is likely due to the fact that carbonate was not excluded from the exchange solutions (always present from atmospheric $CO_2$). Carbonate is known to lower anion capacity for LDHs and is in fact used to regenerate exchanged LDH. The meq/g adsorption capacities for each of the anion exchangers are summarized in Table 1.

TABLE 1

Perchlorate exchange capacities of the various cationic host materials tested

| Anion Exchanger | mg $ClO_4^-$/g | mol $ClO_4^-$/g | meq/g | % $ClO_4^-$/g removal |
|---|---|---|---|---|
| RT-SBN | 353.97 | 1.062 | 3.569 | 99% |
| HT-SBN | 269.67 | 0.884 | 2.712 | 82% |
| Uncalcined Hydrotalcite-LDH | 10.62 | 0.065 | 0.107 | 0.5% |
| Calcined Hydrotalcite-LDH | 47.51 | 0.289 | 0.478 | 12% |
| Uncalcined $Ni_3Al$-LDH | 5.85 | 0.048 | 0.059 | 1.6% |
| Calcined $Ni_3Al$-LDH | 24.0 | 0.195 | 0.241 | 5.1% |
| AMBERLITE ™ resin IRA-400 Resin | 248.87 | N/A | 2.502 | 78% |
| Purolite A530E Resin | 103.88 | N/A | 1.044 | 30% |

Recyclability

Figure 3:
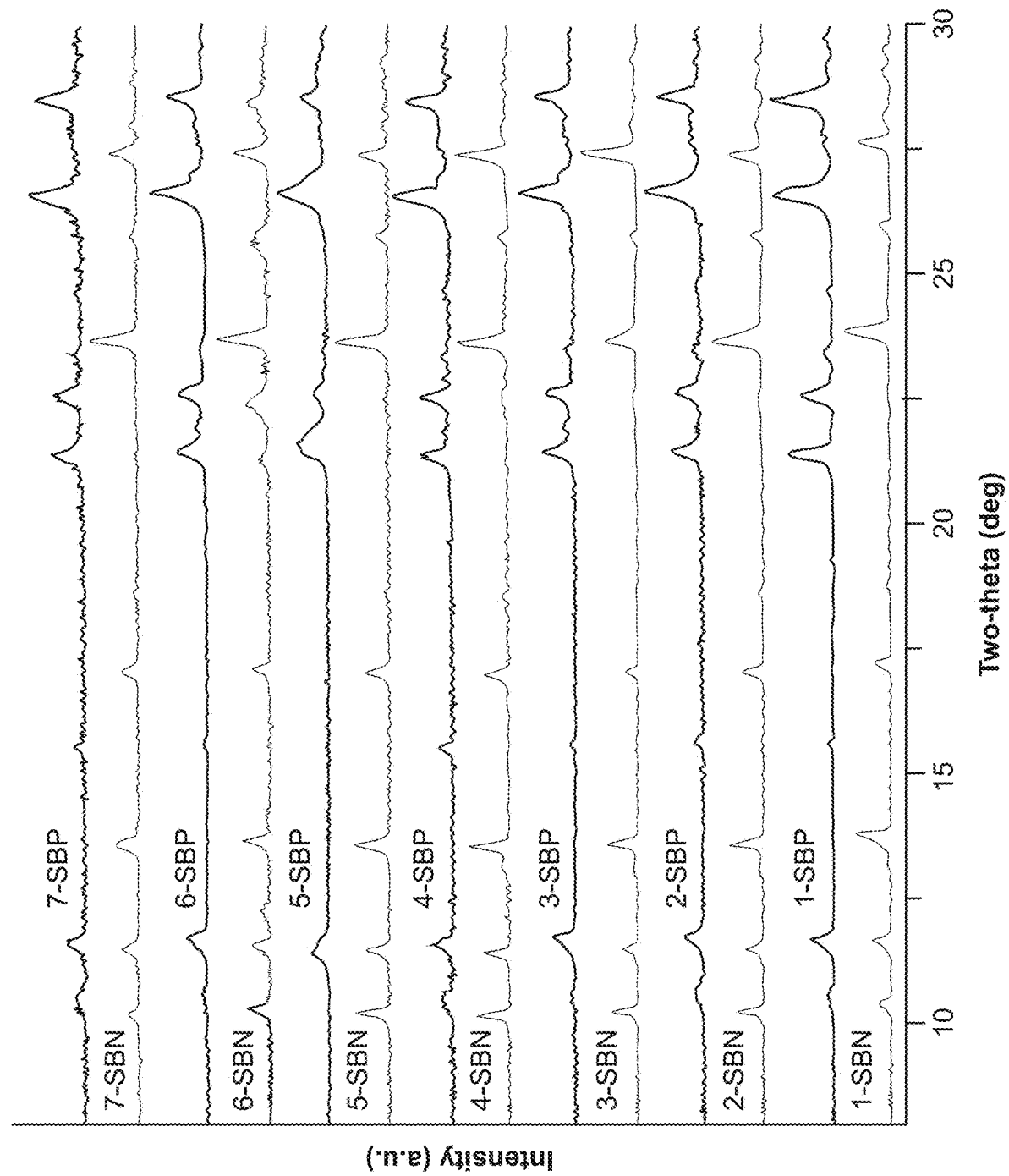
FIG. 3 provides data showing the cyclability of [Ag-bipy$^+$]. The number denotes cycle number, N the nitrate-based material and P the perchlorate-based material.

For any industrial application, the recyclability and durability of the anion exchanger is a critical issue. The material after anion exchange must also be easily recoverable and retain its structure and particle size after multiple regeneration cycles. LDHs often form a gel and require ca. 30 min of centrifuging for total separation from solution, while resins require strong mineral acid or brine and form a slurry. In contrast, SBP remains crystalline and is easily separated from the anion exchange solution by vacuum filtration. The solid was quantitatively regenerated to phase-pure SBN simply by stirring in a 20-fold molar excess 0.1 M sodium nitrate solution at room temperature or 70° C. and neutral pH for 24 h. The evolved perchlorate as determined by IC showed the room temperature material regenerated an average of 96%. This perchlorate-nitrate cycling shows excellent reversibility on further cycles (FIG. 3) and IC data confirms a high degree of exchange (Table 2).

TABLE 2

Adsorption capacities of perchlorate trapping cycles by RT-SBN

| | Cycle No. | | | | | | |
|---|---|---|---|---|---|---|---|
| | $1^{st}$ | $2^{nd}$ | $3^{rd}$ | $4^{th}$ | $5^{th}$ | $6^{th}$ | $7^{th}$ |
| mol/mol | 1.129 | 0.868 | 0.815 | 0.796 | 1.081 | 0.709 | 0.641 |
| mg/g | 344.36 | 264.93 | 248.63 | 243.05 | 329.86 | 216.35 | 195.59 |
| meq/g | 3.463 | 2.664 | 2.500 | 2.444 | 3.316 | 2.175 | 1.966 |

Figure 8:
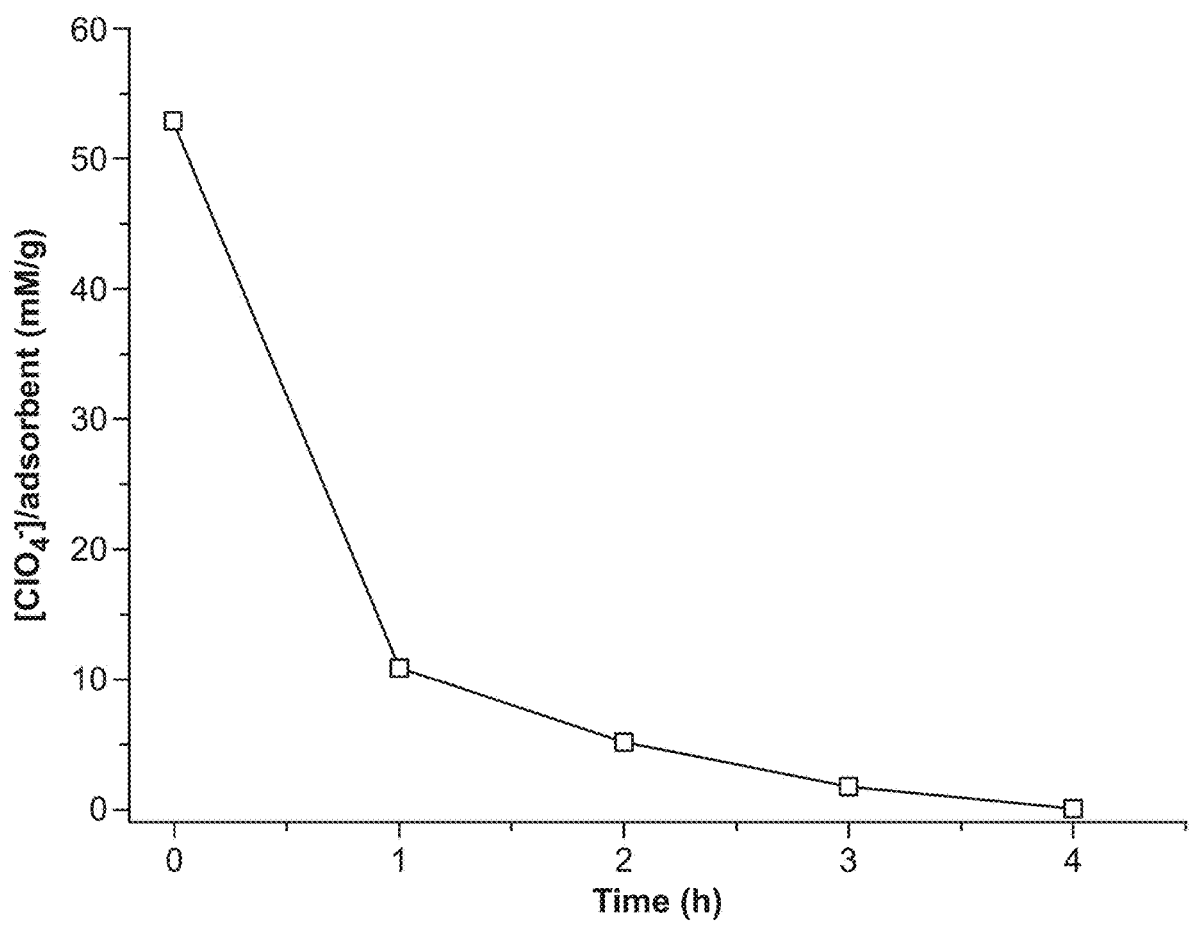
FIG. 8 provides data showing second cycle perchlorate uptake per gram of RT-SBN solid versus time.
Figure 12:
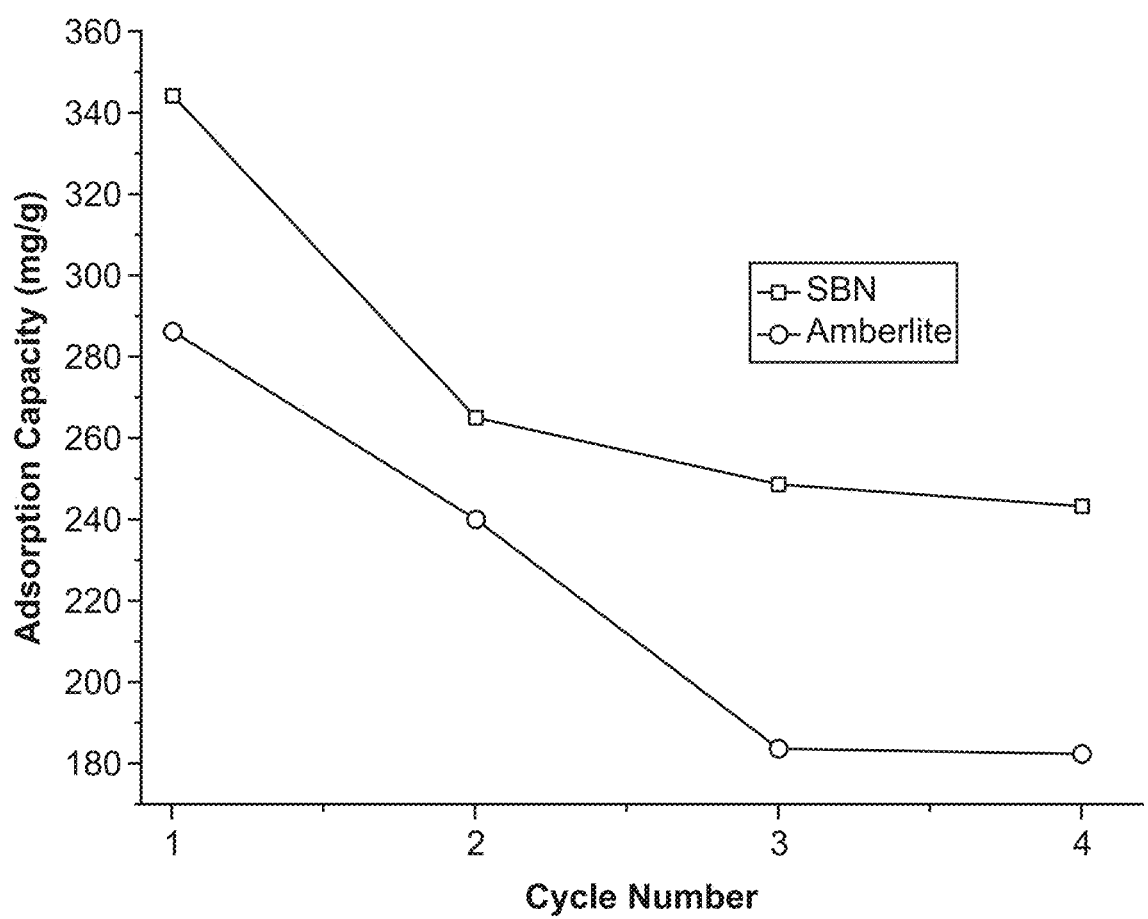
FIG. 12 depicts perchlorate uptake capacity of SBN versus cycle number.

Seven cycles are shown for proof of concept. New SBN crystals are formed upon regeneration (FIG. 6, Panel D), meaning fresh crystals are formed on each cycle for unprecedented recyclability (FIG. 8). The Purolite resin displayed negligible recyclability even upon treatment with 10% hydrochloric acid solution after perchlorate uptake. The theoretical capacity per gram of SBN material per cycle is 0.354 g of perchlorate, which would correspond to the ability to treat (for example) 17,700 L of 20 ppb perchlorate contaminated water. In the case of the AMBERLITE™ resin, its theoretical capacity per cycle of 0.249 g perchlorate would treat only 12,400 L of 20 ppb contaminated water and require concentrated brine solution or mineral acid treatment for each regeneration cycle. The performance of SBN and AMBERLITE™ resin can be seen in a plot of the uptake capacity versus cycle number (FIG. 12).

Figure 9:
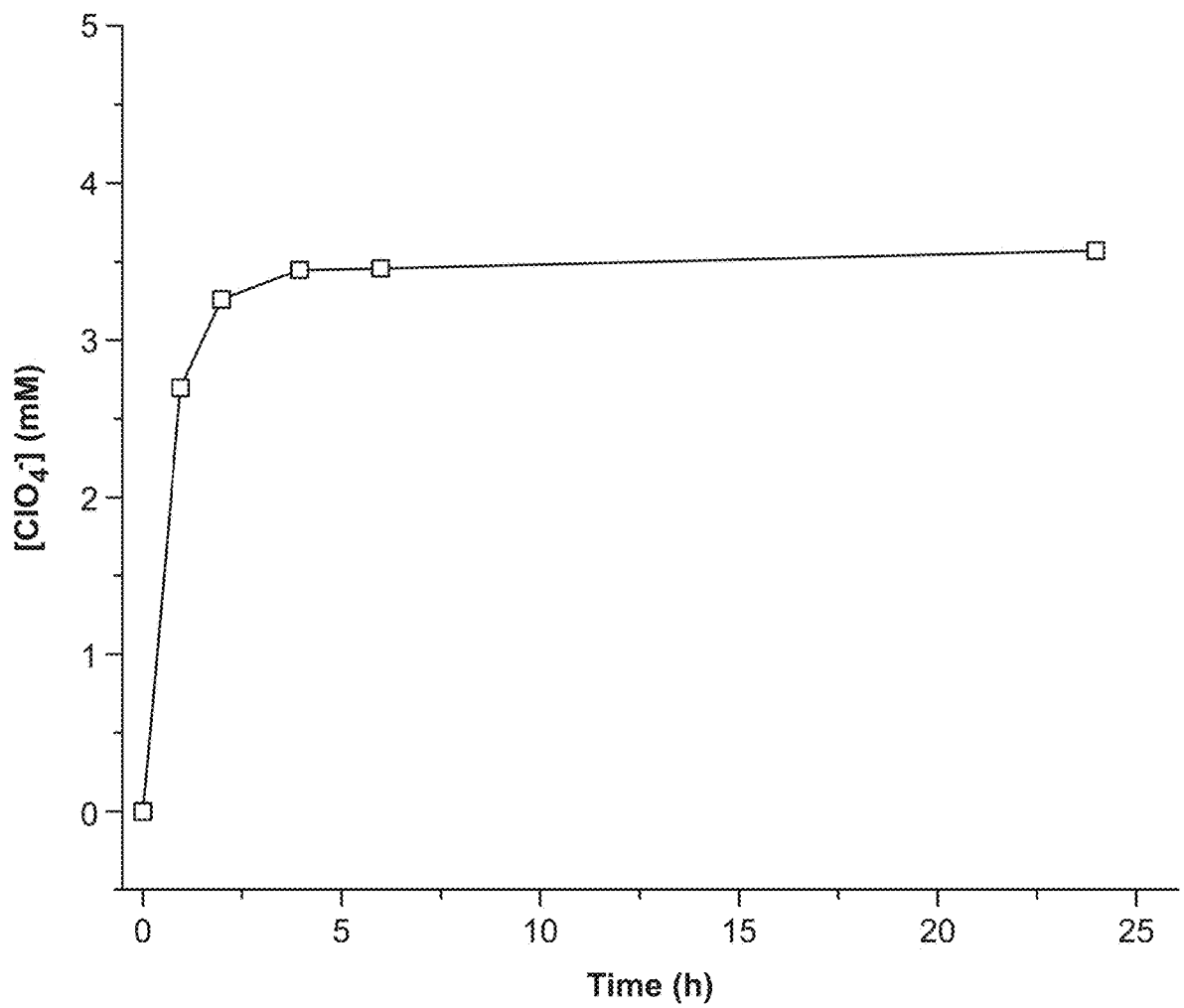
FIG. 9 provides data showing SBN regeneration. Plotted is perchlorate release from SBP versus time in sodium nitrate solution at 20-fold molar excess.
Figure 10:
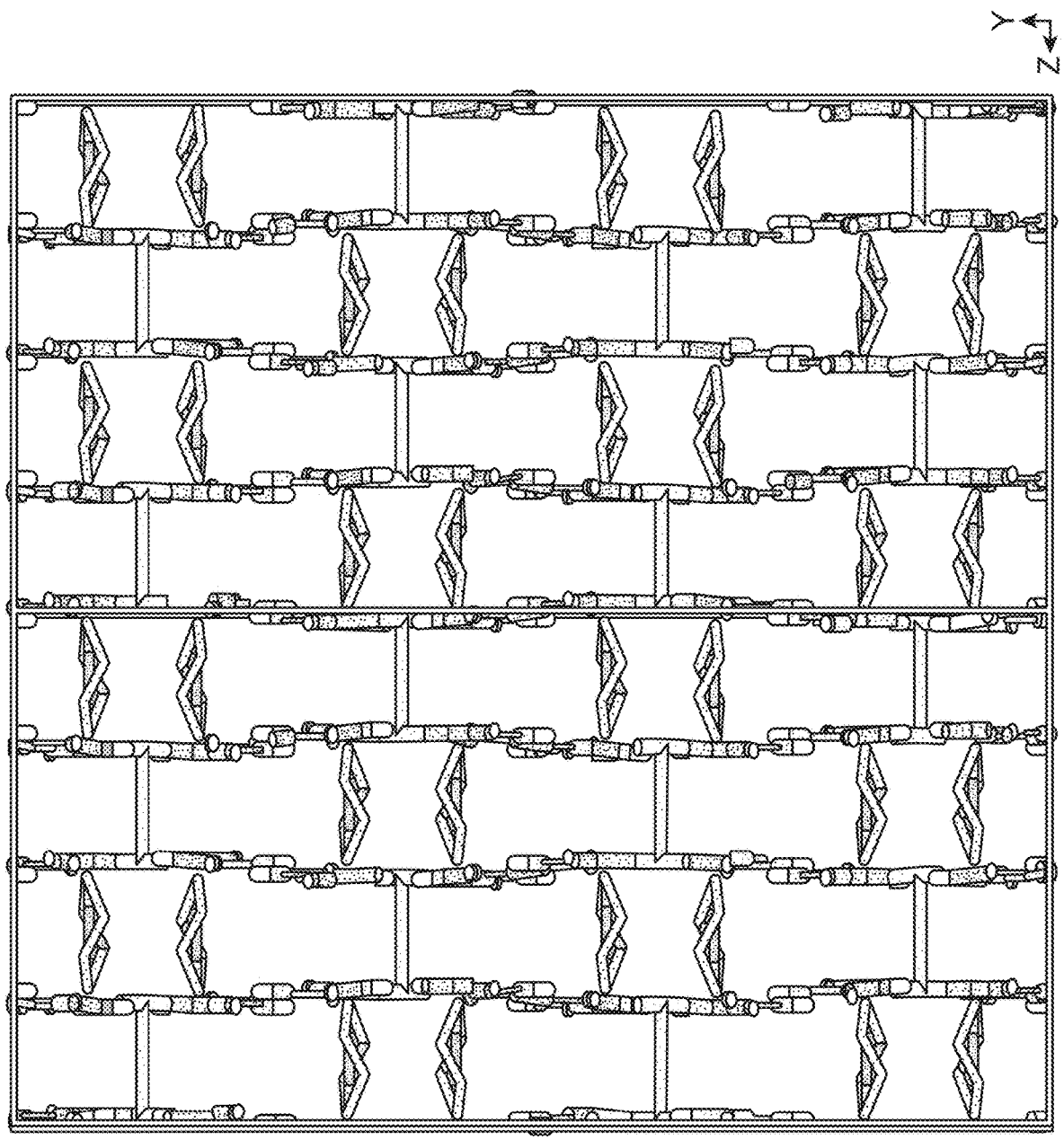
FIG. 10 shows the crystallographic view of SBN with disordered nitrates included.
Figure 11:
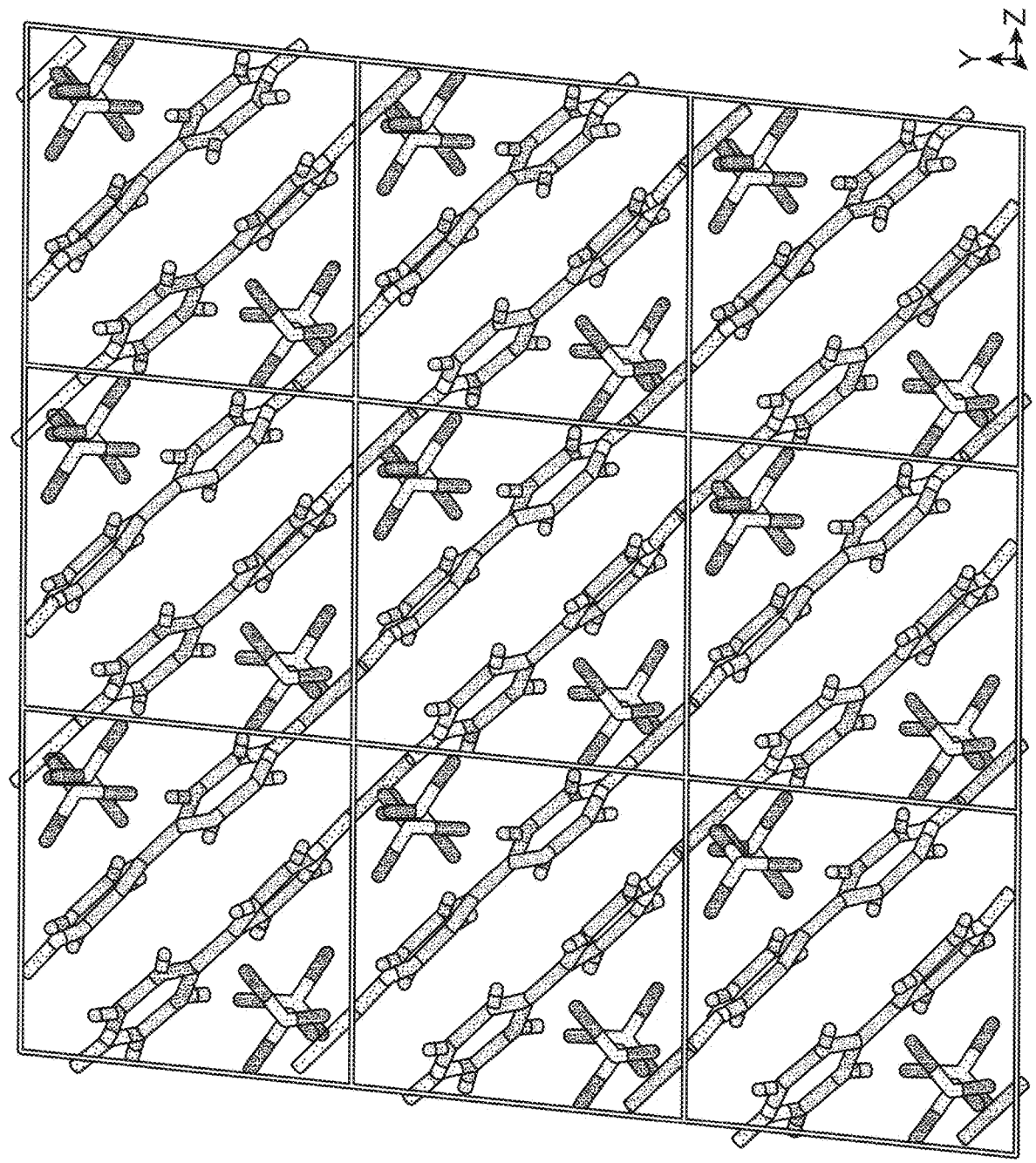
FIG. 11 shows the crystallographic view of SBP with disordered perchlorates included.
Figure 14:
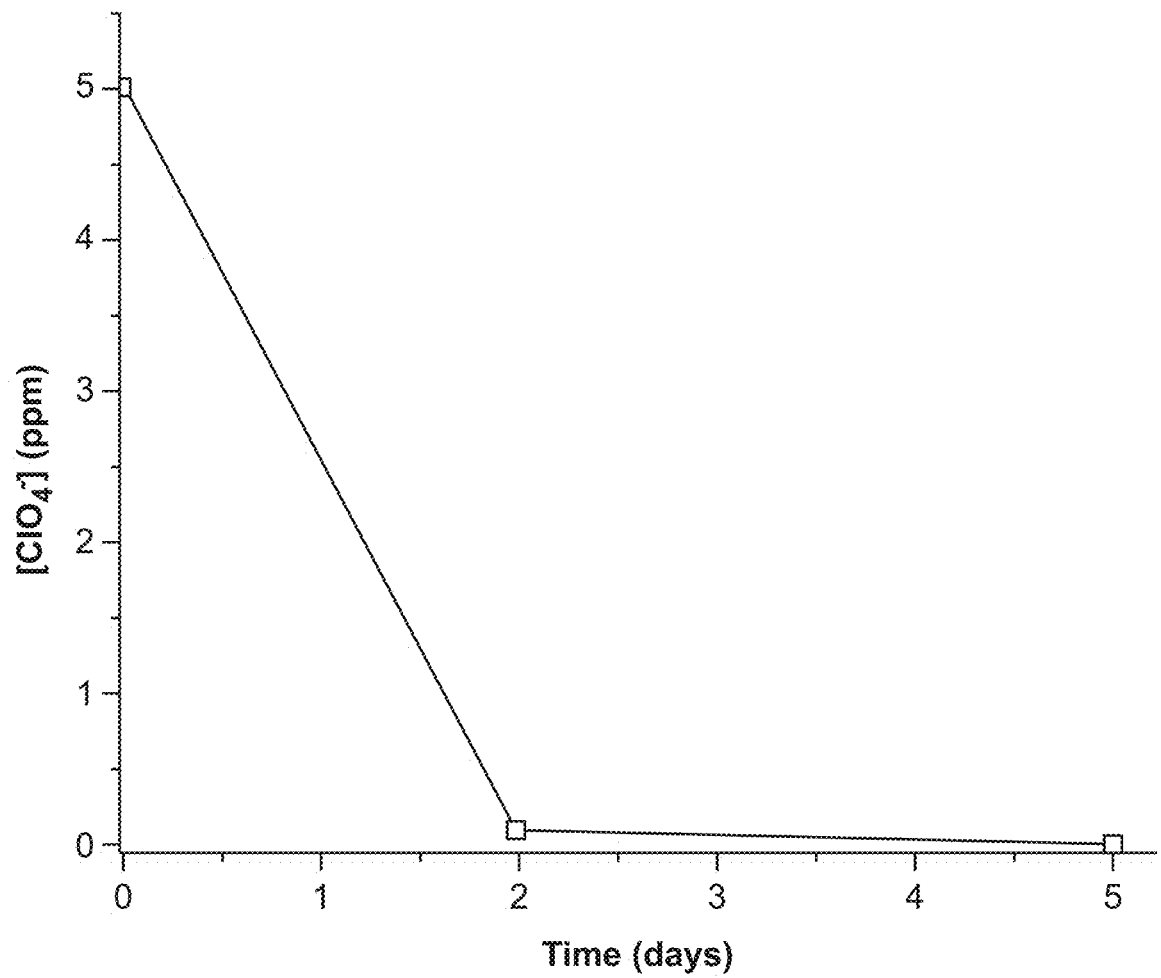
FIG. 14 depicts 5 ppm perchlorate removal by SBN.

In addition to these highly desirable exchange properties, the material must be able to capture low concentration perchlorate. The above experiments were 200 ppm concentration. In initial experiments, 50 ppm was tested and the material exchanged 84% over 7 days. The perchlorate uptake is at a much faster rate and deeper level for our material compared to resins and LDHs (FIG. 2). As an initial test of even lower concentration, exchange at 5 ppm perchlorate was performed, which is within the range of contaminated underground water plumes. 60 mg of SBN exhibited a 100% perchlorate removal over 5 days and static conditions (FIG. 14). These features may also make it possible to use the material in a flow column. Regeneration can then occur offline in excess nitrate solution at room temperature or at 70° C. condition over the longer required time frame (FIG. 9).

Structural Considerations

Figure 4A:
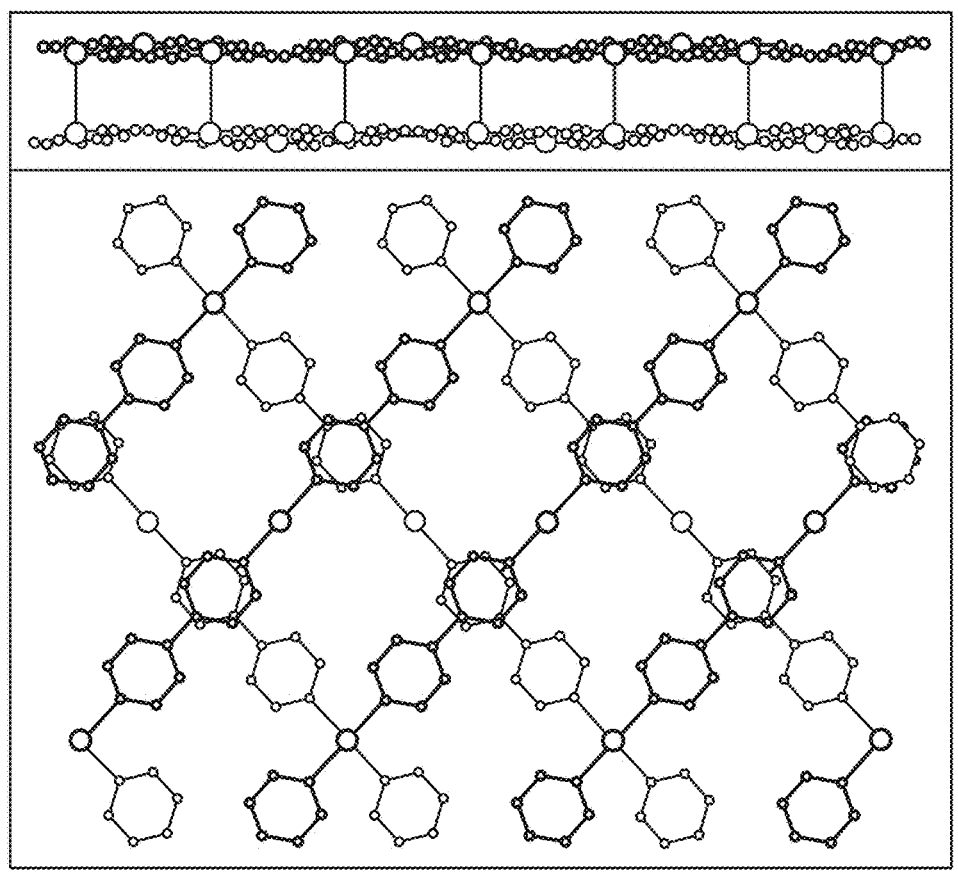
FIG. 4, Panels A and B show crystallographic views of two [Ag-bipy$^+$] "layers" (corresponding side views shown at top; anions and hydrogens omitted for clarity). SBN, [Ag-bipy$^+$][$NO_3^-$] is shown in Panel A, where the layers are oriented approximately 90° to each other and only half the pyridine rings π-stack to the adjacent layer. SBP, [Ag-bipy$^+$][$ClO_4^-$] is shown in Panel B, with the viewing angle offset slightly to emphasize the large degree of π-stacking.
Figure 4B:
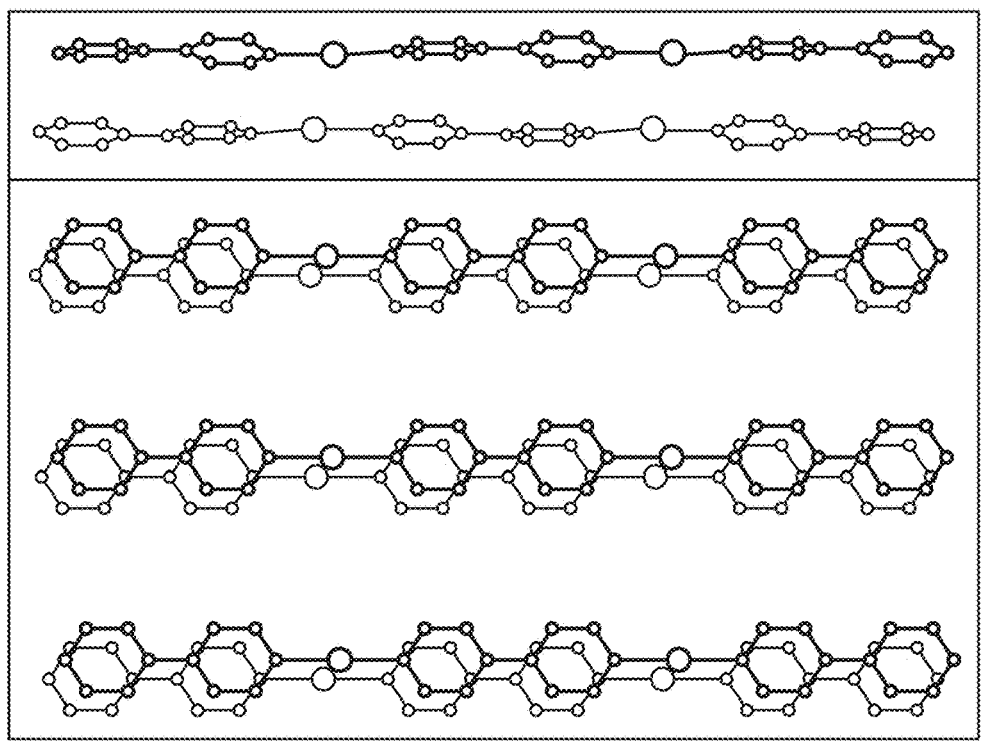

[Ag-bipy$^+$] displays greater preference for perchlorate than nitrate, allowing for the rapid trapping of ppm level perchlorate from contaminated water. Regeneration of the nitrate form can occur offline in excess nitrate to obtain a concentrated perchlorate wasteform. The greater preference of [Ag-bipy$^+$] for perchlorate over nitrate can be understood by considering the SBN and SBP crystal structures. For both, each Ag(I) is chelated by the nitrogens of two different (μ-2)-4,4'-bipyridine units, forming extended polymeric chains. These chains align parallel into a non π-stacked "layer" where the rings are all co-planar with the plane of the page (FIG. 4). The two structures differ in the arrangement of the next "layer" (FIG. 4). For SBN, the next "layer" is rotated by 90° (FIG. 4, Panel A) whereas for SBP the "layers" are eclipsed (FIG. 4, Panel B). For SBN, only half of the pyridine rings π-stack and in a staggered manner to the adjacent "layer" (FIG. 4, Panel A, average distance 3.55 Å) whereas all pyridine rings π-stack and are eclipsed for SBP (FIG. 4, Panel B, average distance 3.47 Å). For SBN, half of the silver centers dimerize [Ag—Ag distance 2.97(1) Å] and cross-link to the next "layer" to define a 3-D MOF (FIG. 4, Panel A, top). For SBP, the silvers have a long contact of 3.60(1) Å, which is well outside the median covalent bond length of 3.047±0.193 Å by a Conquest/Vista search of the Cambridge Crystal Structure Database (CSSD).

These two structures transform reversibly and are a consequence of the shape of the incoming anion that must pack between the cationic polymers. Nitrate is flat while perchlorate is tetrahedral (spheroidal). Both structures are stoichiometrically equivalent, with one mole of the monomeric anion in their formulae. The anion oxygen to silver distances are typical of ionic bonding [2.826(17) Å and 2.782(10) Å for SBP; 2.863(1) Å and 2.945(15) Å for SBP]. SBN has half the degree of π-stacking compared to SBP. SBP is therefore more stable and accounts for the faster exchange of nitrate for dilute perchlorate. Re-intercalation of nitrate requires greater concentration and longer time. The relative stability also explains why recrystallization aids greatly in the excellent level of regeneration, where the polymers reassemble around nitrate.

CONCLUSION

As prepared, the SBN material displays outstanding propensity towards the toxologically important pollutant perchlorate. The capture capacity, kinetics, selectivity, regenerability and cyclability are all unprecedented and represent a significant advance in the methods available for water purification. The regeneration method actually takes advantage of the metastability of MOFs by reassembling back into the regenerated form. It is possible that other problematic elements that also occur in their oxo-anion form in water may be able to be trapped in this manner, such as chromium-6 (also known as hexavalent chromium or chromate), arsenite/arsenate, selenite/selenate and even actinates if the material is stable to radiation.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present invention, therefore, is not intended to be limited to the exemplary embodiments shown and described herein. Rather, the scope and spirit of the present invention is embodied by the appended claims.

What is claimed is:

1. A method of removing perchlorate from water, comprising:
   contacting water containing perchlorate with a cationic material, wherein the cationic material comprises:
   a plurality of silver ions and a plurality of nitrate ions connected into an extended structure by 4,4' bipyridine,
   to remove perchlorate from the water.

2. The method according to claim 1, wherein the material is a metal-organic framework (MOF) material.

3. The method according to claim 2, wherein the MOF material is a two-dimensional MOF material.

4. The method according to claim 2, wherein the MOF material is a three-dimensional MOF material.

5. The method according to claim 1, wherein the cationic material was synthesized at room temperature.

6. The method according to claim 1, wherein the cationic material was synthesized hydrothermally.

7. The method according to claim 1, wherein the contacting comprises flowing the water through and/or flowing or stirring the water around the cationic material.

8. The method according to claim 1, further comprising regenerating the cationic material by contacting the cationic material with a regenerant that comprises nitrate ions.

9. The method according to claim 8, further comprising contacting water containing perchlorate with the regenerated cationic material.

10. The method according to claim 1, further comprising, after contacting the water with the cationic material, reducing the amount of perchlorate in the cationic material by contacting the cationic material with perchlorate reducing bacteria.

11. The method according to claim 1, wherein the cationic material is $[Ag(I)\text{-bipy}^+][NO_3^-]$.

12. A water treatment vessel comprising the cationic material of claim 1.

13. The method according to claim 5, wherein the cationic material is $[Ag(I)\text{-bipy}^+][NO_3^-]$ and is in form of microcrystalline powdered material with 4 to 10 μm average sized blocks.

14. The method according to claim 6, wherein the cationic material is $[Ag(I)\text{-bipy}^+][NO_3^-]$ and is in form of parallelpiped crystals 400 to 600 μm in length.

\* \* \* \* \*